US010562414B2

(12) United States Patent
Condamin et al.

(10) Patent No.: US 10,562,414 B2
(45) Date of Patent: Feb. 18, 2020

(54) TRACK ASSEMBLY

(71) Applicant: Lear Corporation, Southfield, MI (US)

(72) Inventors: Thibaud Condamin, Orliénas (FR); Nordine Hamtache, Roche la Moliere (FR); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/131,415

(22) Filed: Sep. 14, 2018

(65) Prior Publication Data

US 2019/0337415 A1 Nov. 7, 2019

(30) Foreign Application Priority Data

May 4, 2018 (FR) ...................................... 18 53891
May 4, 2018 (FR) ...................................... 18 53892
May 4, 2018 (FR) ...................................... 18 53893
May 4, 2018 (FR) ...................................... 18 53894

(51) Int. Cl.
*F16M 13/00* (2006.01)
*B60N 2/07* (2006.01)
*B60N 2/08* (2006.01)
*B60N 2/20* (2006.01)

(52) U.S. Cl.
CPC ......... *B60N 2/0722* (2013.01); *B60N 2/0818* (2013.01); *B60N 2/0843* (2013.01); *B60N 2/20* (2013.01)

(58) Field of Classification Search
CPC ..... B60N 1/123; B60N 2/0715; B60N 2/0837
See application file for complete search history.

(56) References Cited

U.S. PATENT DOCUMENTS

| 4,511,187 A | 4/1985 | Rees |
| 4,575,295 A | 3/1986 | Rebentisch |
| 4,830,531 A | 5/1989 | Condit et al. |
| 5,489,173 A | 2/1996 | Hofle |

(Continued)

FOREIGN PATENT DOCUMENTS

| DE | 102005007430 A1 | 3/2006 |
| DE | 102010063615 A1 | 2/2012 |

(Continued)

OTHER PUBLICATIONS

Co-pending U.S. application, Condamin, et al., U.S. Appl. No. 16/131,360, filed Sep. 14, 2018.

(Continued)

*Primary Examiner* — Amy J. Sterling
(74) *Attorney, Agent, or Firm* — Fishman Stewart PLLC

(57) ABSTRACT

A track assembly includes a track, a support member, and/or a lever. The support member may be connected to the track, and/or the lever may be connected to the support member. The lever may include a rotational axis substantially parallel to the track. The lever may rotate about the rotational axis between a first position and a second position. The lever may limit movement of the support member relative to the track in a first direction, and/or the lever may not limit movement of the support member relative to the track in a second direction. The lever may be configured to contact the track. The track may include a window having a first edge and/or a second edge.

20 Claims, 9 Drawing Sheets

(56) References Cited

U.S. PATENT DOCUMENTS

| | | | |
|---|---|---|---|
| 5,655,816 A | 8/1997 | Magnuson et al. | |
| 5,899,532 A | 5/1999 | Paisley et al. | |
| 5,964,442 A | 10/1999 | Wingblad et al. | |
| 6,227,595 B1 | 5/2001 | Hamelin et al. | |
| 6,439,531 B1 | 8/2002 | Severini et al. | |
| 6,719,350 B2 | 4/2004 | Duchateau et al. | |
| 6,736,458 B2 | 5/2004 | Chabanne et al. | |
| 7,300,091 B2 | 11/2007 | Nihonmatsu et al. | |
| 7,434,883 B2 | 10/2008 | Deptolla | |
| 7,523,913 B2 * | 4/2009 | Mizuno | B60N 2/123 248/429 |
| 8,702,170 B2 | 4/2014 | Abraham et al. | |
| 8,757,720 B2 | 6/2014 | Hurst, III et al. | |
| 8,857,778 B2 * | 10/2014 | Nonomiya | B60N 2/0715 248/429 |
| 8,967,719 B2 | 3/2015 | Ngiau et al. | |
| 9,010,712 B2 | 4/2015 | Gray et al. | |
| 9,162,590 B2 * | 10/2015 | Nagura | B60N 2/0837 |
| 9,340,125 B2 | 5/2016 | Stutika et al. | |
| 9,663,232 B1 | 5/2017 | Porter et al. | |
| 2011/0024595 A1 * | 2/2011 | Oi | B60N 2/0705 248/429 |
| 2015/0048206 A1 | 2/2015 | Deloubes | |
| 2017/0166093 A1 | 6/2017 | Cziomer et al. | |
| 2019/0001846 A1 | 1/2019 | Jackson et al. | |

FOREIGN PATENT DOCUMENTS

| | | |
|---|---|---|
| DE | 102015212100 A1 | 12/2015 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 2298609 A2 | 3/2011 |
| EP | 1699661 B1 | 8/2012 |
| EP | 3150426 A1 | 4/2017 |
| FR | 2762814 | 11/1998 |
| FR | 2864481 B1 | 4/2006 |
| FR | 2986751 A1 | 8/2013 |
| JP | 2013230721 A | 11/2013 |
| WO | 01/87665 A1 | 11/2001 |
| WO | 2005/068247 A2 | 7/2005 |

OTHER PUBLICATIONS

Co-pending U.S. application, Condamin, et al., U.S. Appl. No. 16/131,384, filed Sep. 14, 2018.

Co-pending U.S. application, Condamin, et al., U.S. Appl. No. 16/131,404, filed Sep. 14, 2018.

Co-pending U.S. application, Condamin, et al., U.S. Appl. No. 16/131,614, filed Sep. 14, 2018.

* cited by examiner

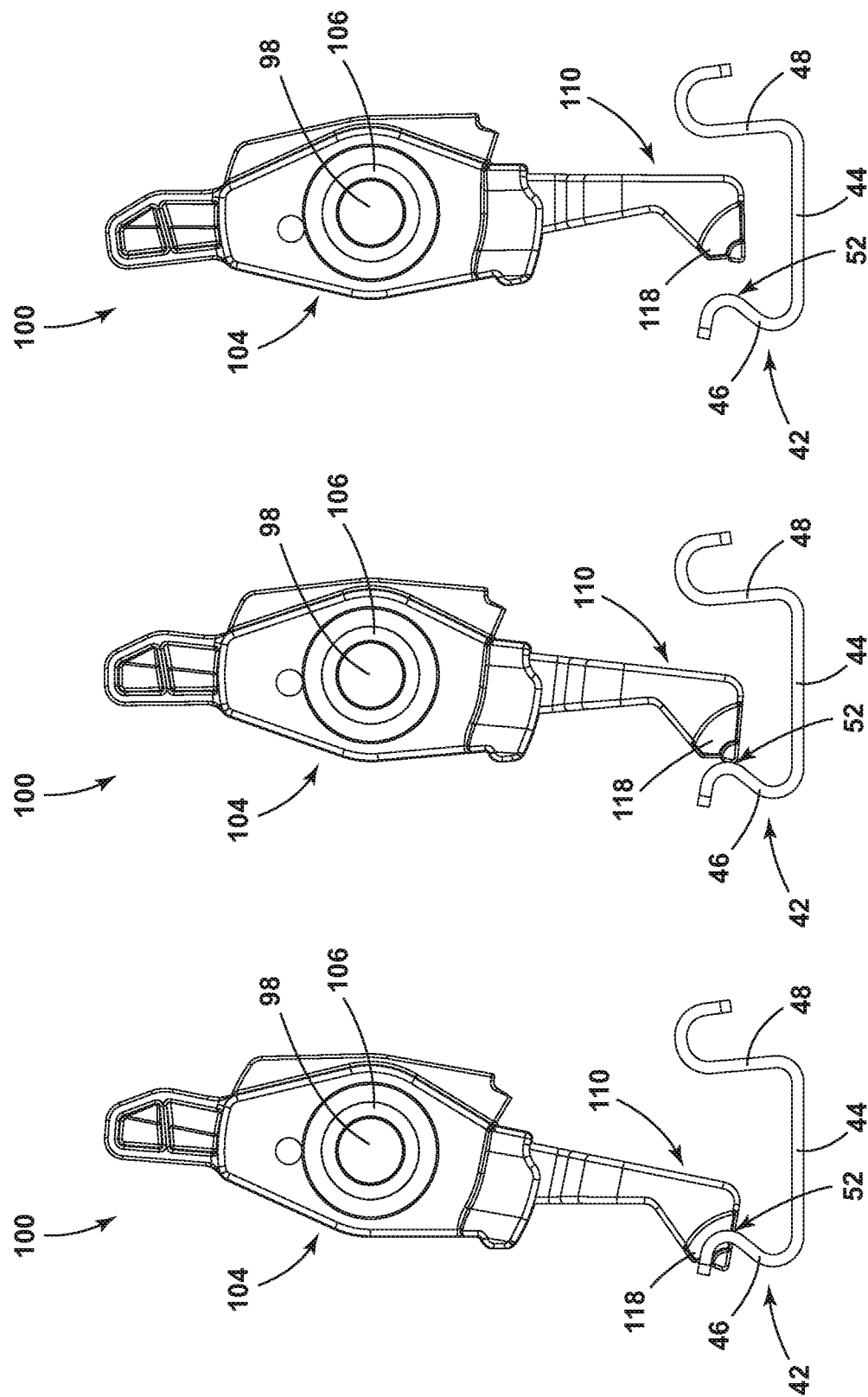

TRACK ASSEMBLY

CROSS-REFERENCE TO RELATED APPLICATIONS

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018; the disclosures of which are hereby incorporated herein by reference in their entireties.

TECHNICAL FIELD

The present disclosure generally relates to track assemblies, including track assemblies that may be used in connection vehicle seat tracks.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex and/or may not provide sufficient functionality. Movement of some track assemblies may not be automatically limited.

There is a desire for solutions/options that minimize or eliminate one or more challenges or shortcomings of track assemblies. The foregoing discussion is intended only to illustrate examples of the present field and should not be taken as a disavowal of scope.

SUMMARY

In embodiments, a track assembly may include a track, a support member, and/or a lever. The support member may be connected to the track, and/or the lever may be connected to the support member. The lever may include a rotational axis substantially parallel to the track. The lever may rotate about the rotational axis between a first position and/or a second position. The lever may limit movement of the support member relative to the track in a first direction, and/or the lever may not limit movement of the support member relative to the track in a second direction. The lever may be configured to contact the track. The track may include a window having a first edge and/or a second edge. The contact portion of the lever may be disposed in the window when the lever is in a first position. The lever may include a contact portion that may have a first portion, a second portion, and/or a third portion which may connect the first portion and/or the second portion. When the contact portion may be in the first position, the third portion of the contact portion may not be in contact with the track. When the contact portion may be in a second position, the third portion may not be in contact with the track.

With embodiments, the first portion may be substantially perpendicular to the track, and/or the second portion may be tapered. The lever may not be configured to rotate upon contact with a rear edge of the window of the track when the lever may be in the first position. The second portion may be configured to cause rotation of the lever upon contact with a front edge of a window of the track. The second portion may be disposed at an acute angle relative to the front edge of the window. The second portion may be disposed at an acute angle relative to the first portion. The lever may include a damper portion configured to contact a rear edge of a window of the track. The lever may not be configured to automatically rotate when disposed in a window of the track and/or the support member is moving in a first direction. The lever may be configured to automatically rotate when disposed in the window and/or support member is moving in a second direction. The seat may be in an easy entry position when the lever may be in the second position.

In embodiments, the track may include a first portion and/or a second portion. The first portion may correspond to a comfort range, and/or the second portion may correspond to an easy entry range. The lever may be configured to automatically rotate out of the window as the support member may move from the first portion to the second portion. The lever may be configured to automatically rotate into the window as the support member may move from the second portion to the first portion. The track may include a third portion, and/or the first portion may be disposed between the second portion and the third portion. The lever may be configured to automatically restrict movement of the support member into the third portion as the support member may move from the second portion toward the third portion. The track assembly may include a biasing member that may be configured to bias the lever toward the first position. The lever may be disposed substantially within the support member when the lever is in the second position, and/or a body of the support member may be disposed above the track.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 5A is a cross-sectional view generally illustrating portions of an embodiment of a track and a lever in a first position according to teachings of the present disclosure.

FIG. 5B is cross-sectional view generally illustrating portions of embodiments of a track and a lever in a second position according to teachings of the present disclosure.

FIG. 5C is cross-sectional view generally illustrating portions of embodiments of a track and a lever according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1A:
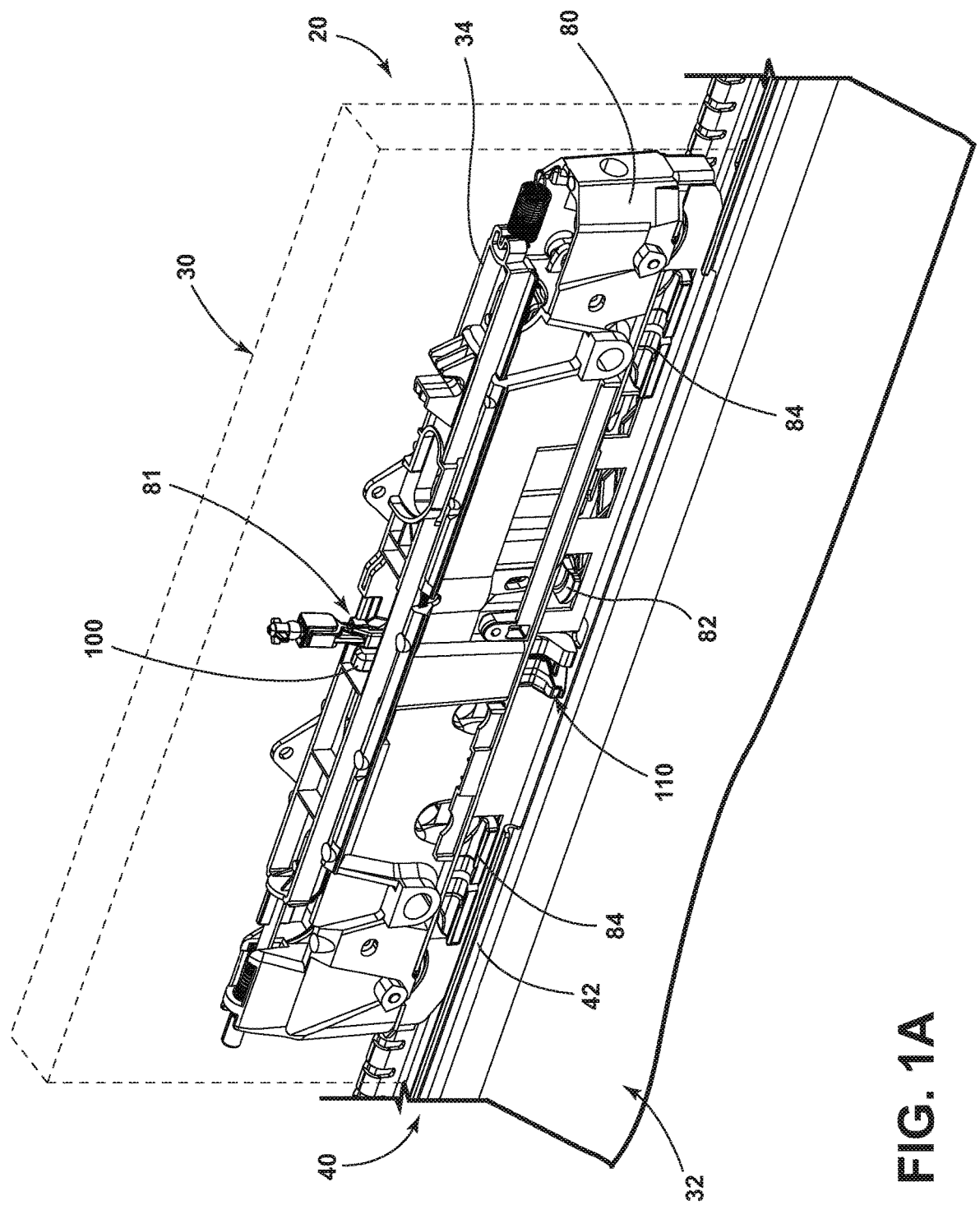
FIG. 1A is a perspective view generally illustrating an embodiment of a track assembly according to teachings of the present disclosure.
Figure 1B:
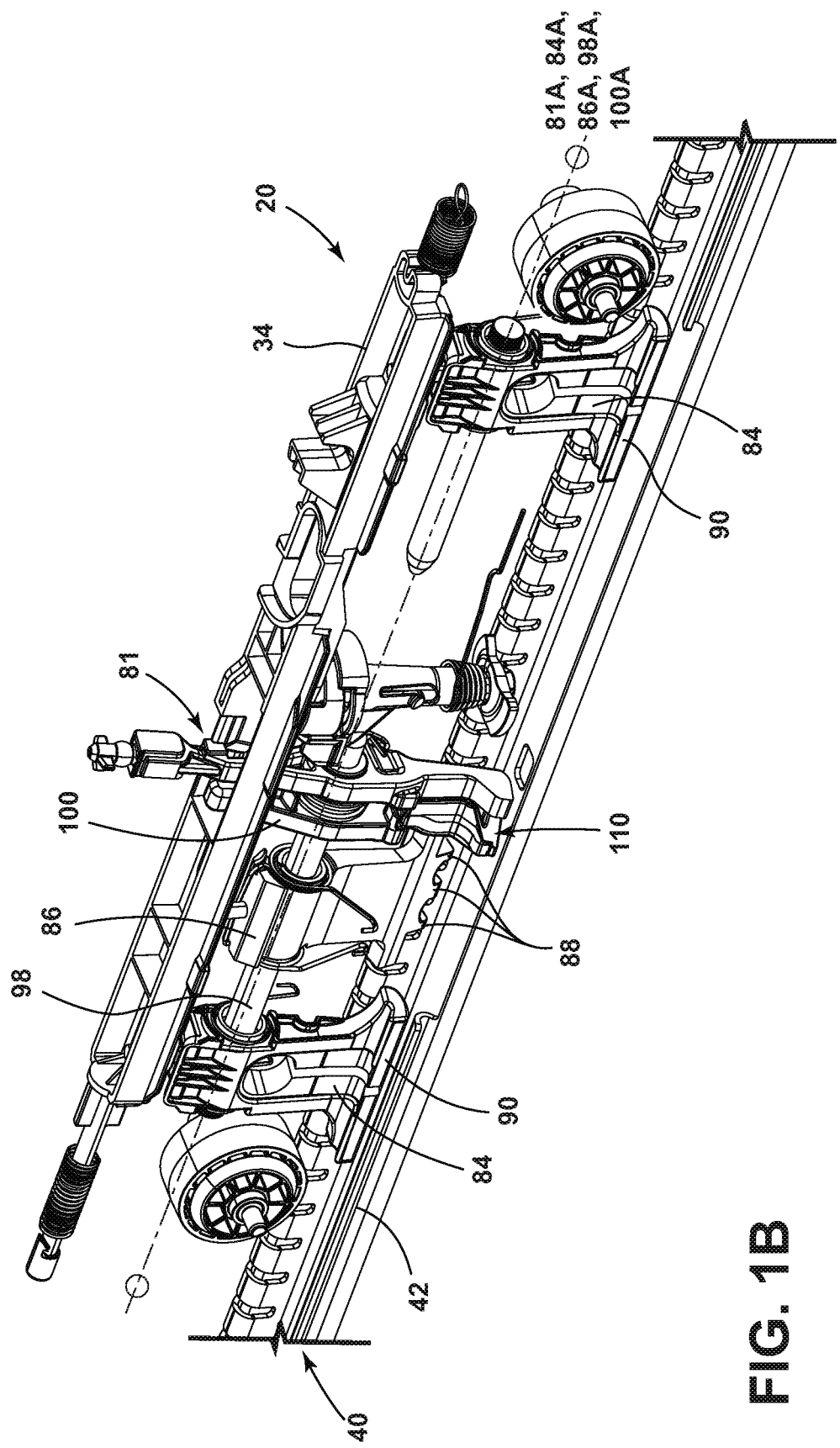
FIG. 1B is a perspective view generally illustrating portions of an embodiment of a track assembly according to teachings of the present disclosure.

In embodiments, such as generally illustrated in FIGS. 1A and 1B, a track assembly 20 may include a track 40, a support member 80, and/or a lever 100. The track assembly 20 may be configured to support an external component 30 (e.g., a vehicle seat and/or seating element) on a track 40. The external component 30 may be referred to herein as a seat 30, but is not limited to a seat. The support member 80 may move (e.g., slide, roll, etc.) along a track 40. The track assembly 20 may be connected to a mounting surface 32 (e.g., such as a floor of a vehicle).

Figure 2A:
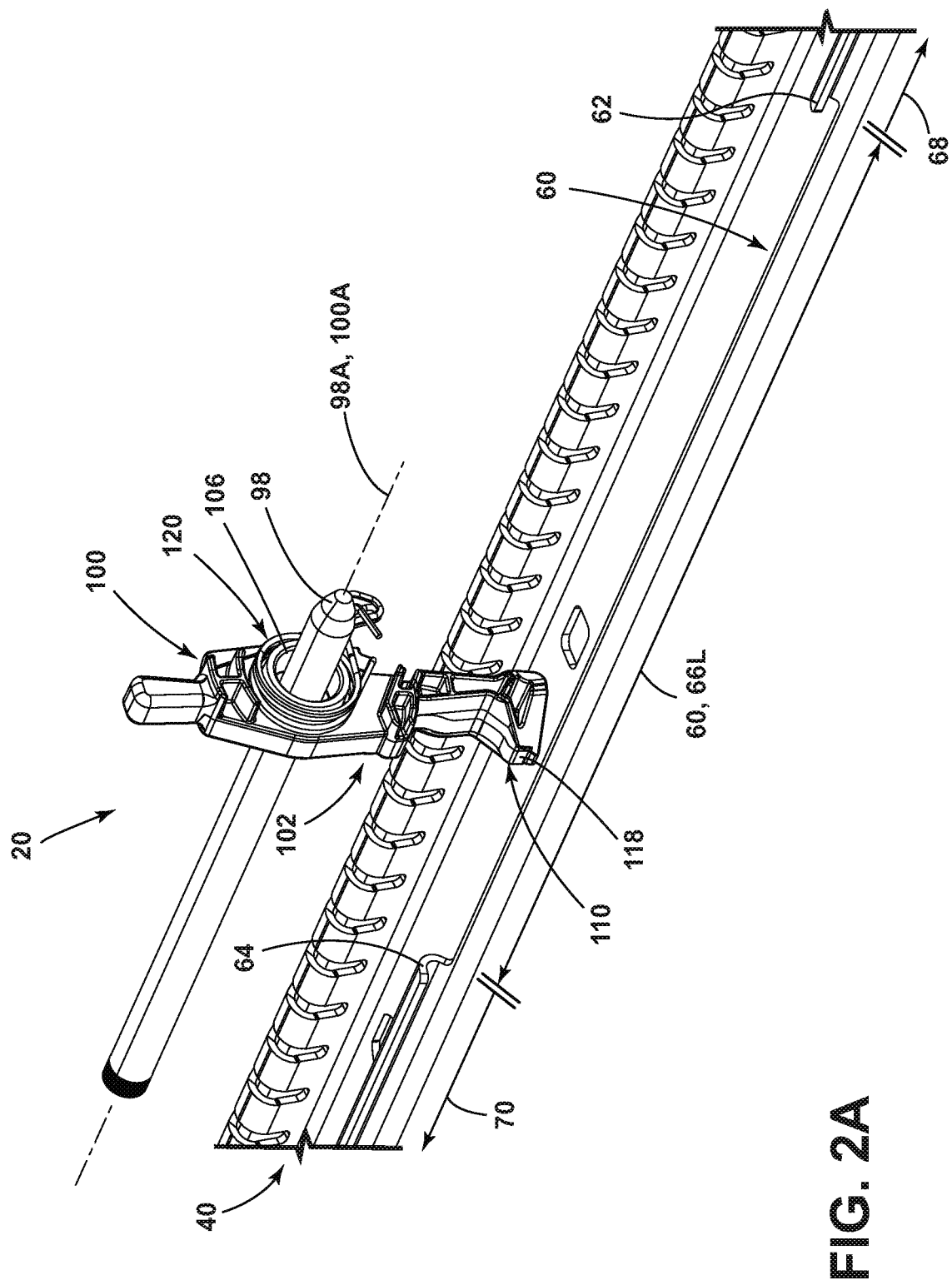
FIGS. 2A and 2B are perspective views generally illustrating portions of embodiments of track assemblies according to teachings of the present disclosure.
Figure 2B:
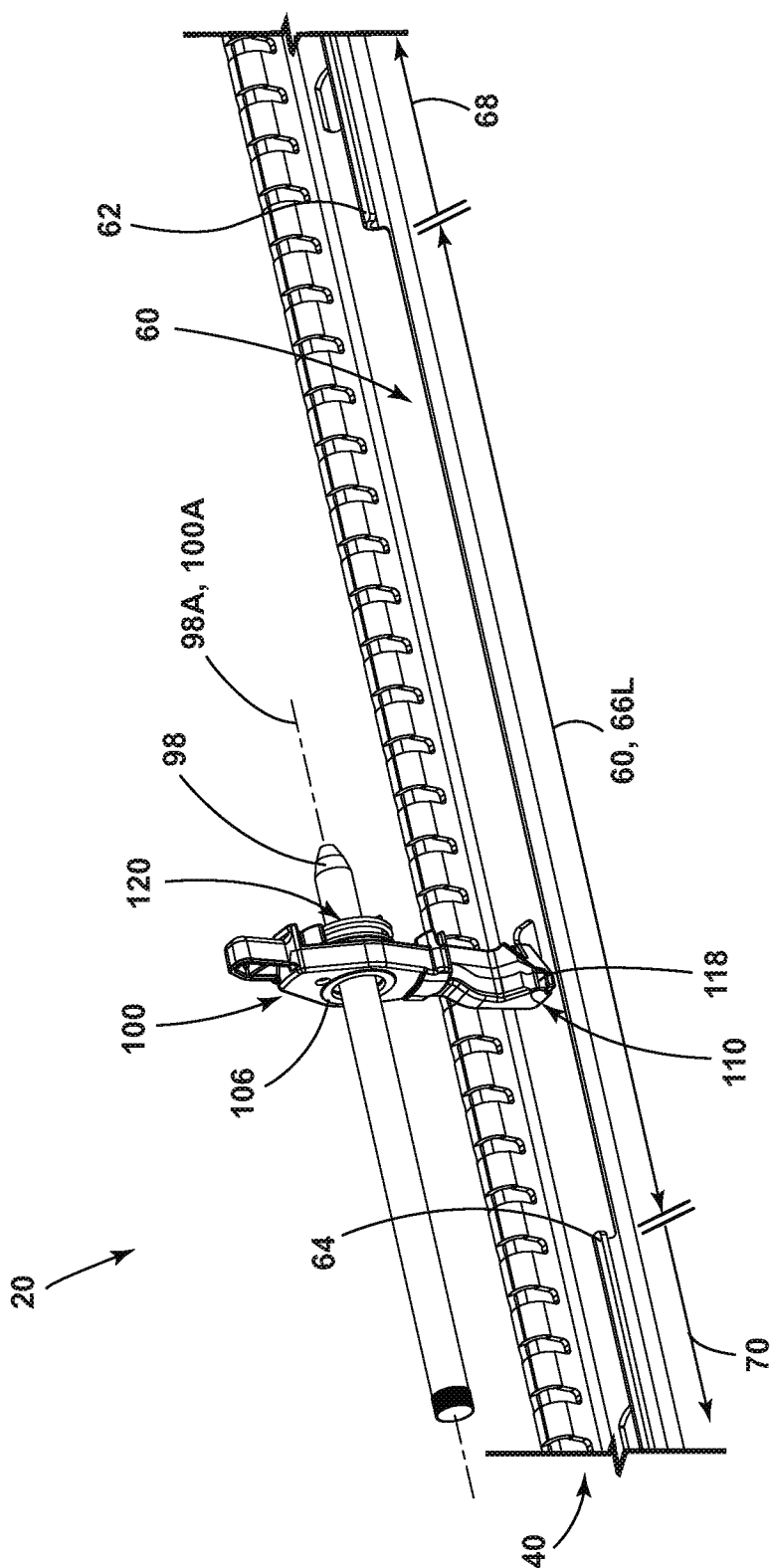
Figure 2C:
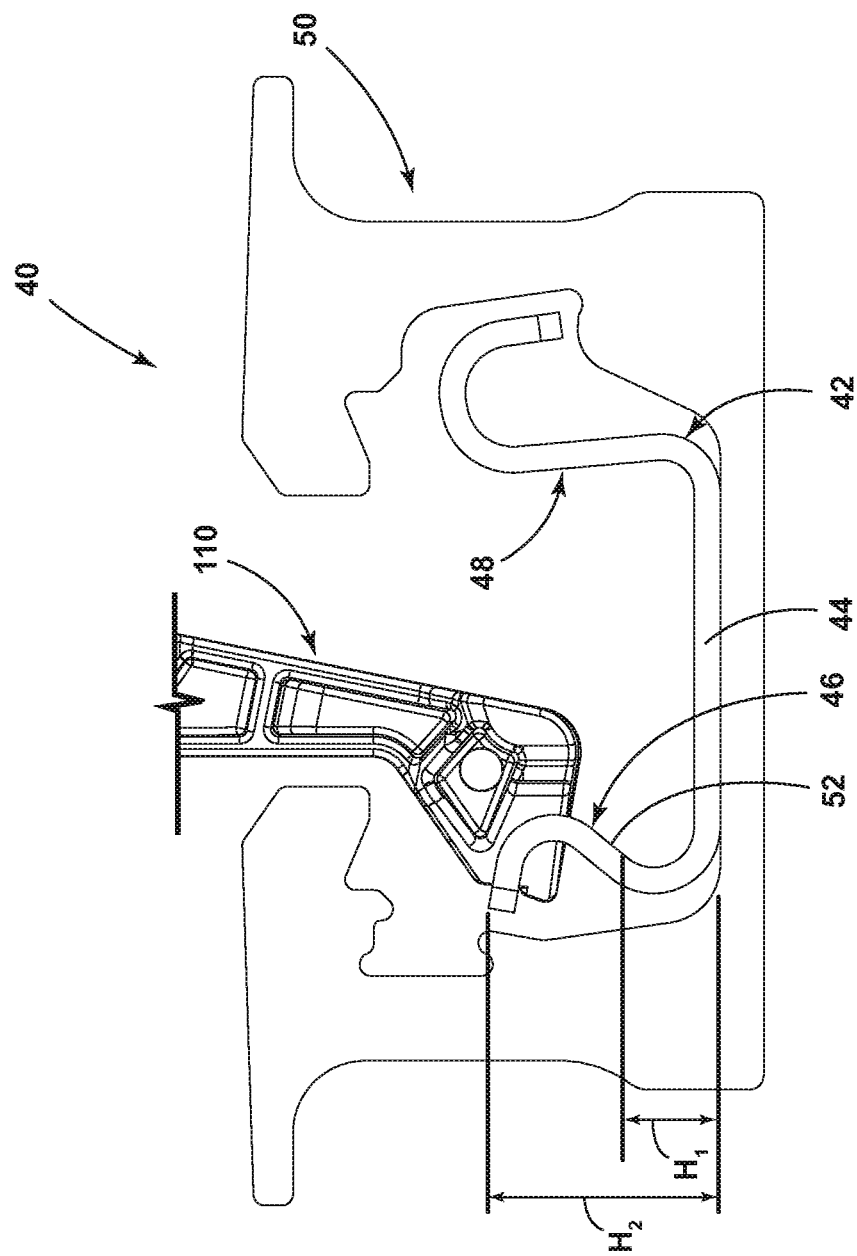
FIG. 2C is a side view of portions of an embodiment of a track assembly according to teachings of the present disclosure.
Figure 3B:
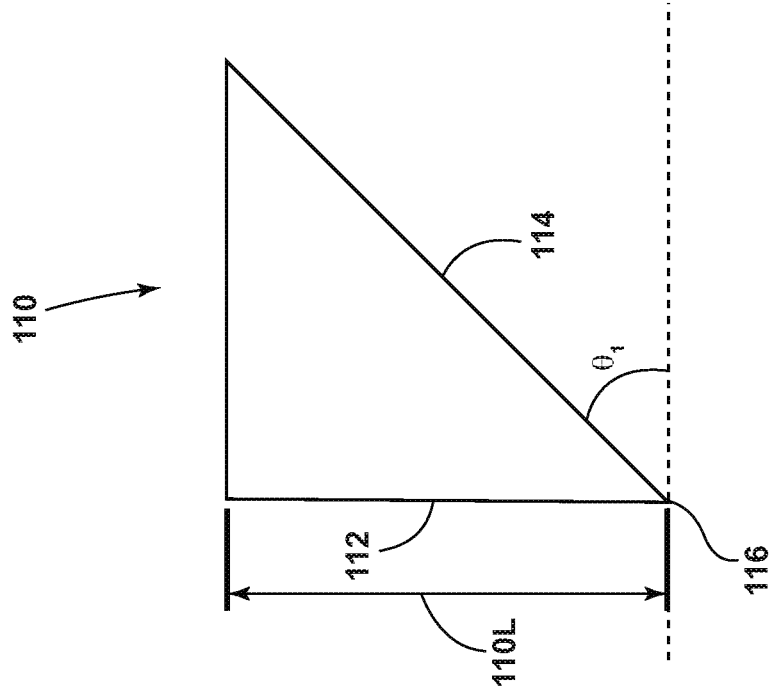
FIGS. 3A and 3B are cross-sectional views generally illustrating portions of embodiments of contact portions according to teachings of the present disclosure.
Figure 3A:
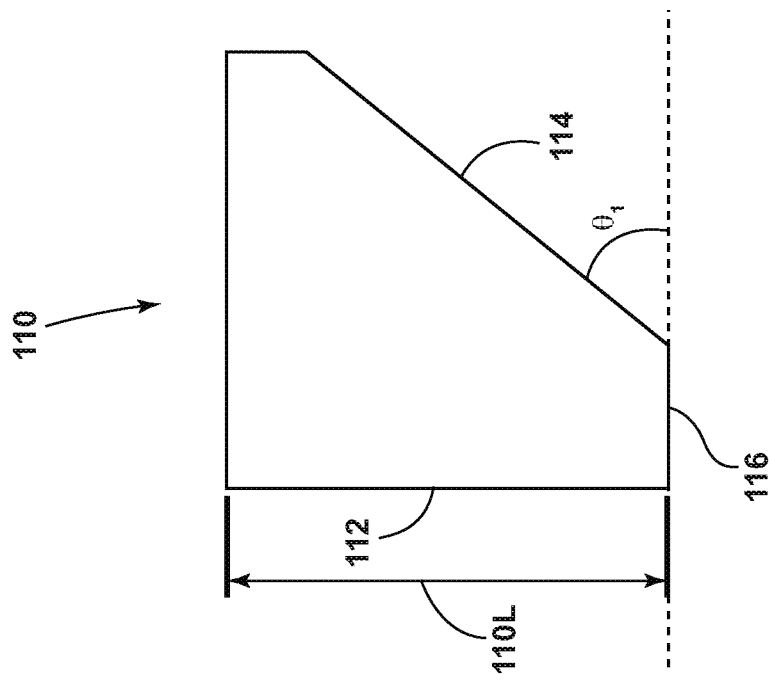

In embodiments, such as generally illustrated in FIGS. 1A and 1B, the track 40 may extend in a longitudinal direction. The track 40 may include an inner portion 42 and an outer portion 50 (see, e.g., FIG. 2C). The inner portion 42 may be disposed substantially within the outer portion 50. The inner portion 42 of the track 40 may include a bottom wall 44, a first side wall 46, and/or a second side wall 48. The bottom wall 44, the first side wall 46, and/or the second side wall 48 may be connected to form a generally U-shaped configuration (see, e.g., FIGS. 2A, 2B, and 2C). The bottom wall 44 may, for example, be substantially planar. The first side wall 46 and/or the second side wall 48 may extend from ends of the bottom wall 44. The first side wall 46 and/or the second side wall 48 may be curved (e.g., may include a generally C-shaped profile). A side wall (e.g., the first side wall 46) may, for example, include a C-shaped profile that may open outward. A side wall (e.g., the second side wall 48) may, for example, include a C-shaped profile that may open downward. With embodiments, the first side wall 46 may include a window 60. The outer portion 50 of the track 40 may include a generally U-shaped configuration.

In embodiments, a window 60 may be configured as a recess in the first side wall 46. The window 60 may extend longitudinally along the first side wall 46. The length 60L of the window 60 may be a percentage of the total length 40L of the track 40. For example and without limitation, the window length 60L may be less than 50% of the total length 40L of the track 40. The window 60 may correspond to a portion of the first side wall 46 with a reduced height. For example, the first side wall 46 may include a first height $H_1$ at or about the window 60, and/or a remainder of the first side wall 46 may include a second height $H_2$, which may be greater than height $H_1$. The first height $H_1$ may, for example and without limitation, be about one-third, one-half, or two-thirds the second height $H_2$. The window 60 may include a first edge 62 and a second edge 64. The first edge 62 may be disposed at a rear end of the window 60, and the second edge 64 may be disposed at a front end of the window 60. The track 40 may include a first portion 66, a second portion 68, and/or a third portion 70. The first portion 66 may correspond to a comfort range of the support member 80 and/or a seat 30. The second portion 68 may correspond to an easy-entry range of the support member 80 and/or a seat 30. The window 60 may extend along some or all of the length of the first portion 66. The first portion 66 may be disposed between (e.g., longitudinally) the second portion 68 and the third portion 70. The second edge 64 of the window 60 may be proximate and/or adjacent to the second portion 68. The first edge 62 of the window 60 may be proximate and/or adjacent to the third portion 70.

In embodiments, such as generally illustrated in FIGS. 1A and 1B, the support member 80 may be configured to connect to a track 40. For example and without limitation, the support member 80 may move in a longitudinal direction along the track 40. The support member 80 may be configured to selectively engage with and/or disengage from the track 40. The support member 80 may be substantially parallel to the longitudinal direction and/or may be generally rectangular.

In embodiments, the support member 80 may include a cassette configuration, and/or may include a rotating member 81, a cam 82, anchoring components 84, and/or a locking component 86, some or all of which may be configured to selectively connect the support member 80 with the track 40. With embodiments, the rotating member 81 and/or the locking component 86 may connect to the inner portion 42 of the track 40. The cam 82 and/or the anchoring components 84 may connect to the outer portion 50 of the track 40.

With embodiments, the support member 80 may include a lever 100. The lever 100, the rotating member 81, the cam 82, the anchoring components 84, and/or the locking component 86 may be disposed substantially within the support member 80. The cam 82 may be configured to rotate about a vertical axis. The cam 82 may limit vertical movement and/or play of the support member 80 relative to the track 40. The locking component 86 may include one or more track locking portions 88 that may be inserted (vertically and/or longitudinally) into the track 40 to restrict longitudinal movement of the track 40. The anchoring components 84 may include an engagement portion 90 to selectively connect the support member 80 to the track 40, such as to restrict removal of the support member 80 (and a seat 30) from the track 40. The rotating member 81 may be configured to contact the track 40, such as at the first edge 62 and/or at the second edge 64 of the window 60, to selectively prevent longitudinal movement of the support member 80 along the track 40. The rotating member 81 may be connected to the lever 100, such as via a rod 98. The rotating member 81, the anchoring components 84, the locking component 86, and/or a lever 100 may rotate about axes 81A, 84A, 86A, 100A, which may be substantially coincident (e.g., may effectively rotate about the same axis). One or more of axes 81A, 84A, 86A, 100A may be disposed substantially parallel with a longitudinal direction and/or may be disposed above the track 40. The rotating member 81, an anchoring component 84, the locking component 86, and/or a lever 100 may be connected via a rod 98. In embodiments, the rod 98 may extend in a longitudinal direction. The rod 98 may be supported by the support member 80 and/or may support the rotating member 81, the anchoring components 84, the locking component 86, and/or a lever 100. The support member 80 may be selectively connected to the track 40 via the anchoring components 84, the locking component 86, and/or a lever 100. The lever 100 may connect to (e.g., selectively engage) the inner portion 42 of the track 40.

In embodiments, such as generally illustrated in FIGS. 1A-2B, a lever 100 may be connected to the support member 80 and/or a rod 98. The support member 80 and/or the rod 98 may rotatably support the lever 100. The lever 100 may include a rotational axis 100A parallel to the track 40. The rotational axis 100A may extend through a body 102 of the lever 100, such as through a middle portion 104 of the body 102. The rotational axis 100A of the lever 100 may be substantially aligned with the longitudinal axis 98A of the rod 98. The body 102 may include an aperture 106 that may be configured to receive the rod 98. With embodiments, the lever 100 may be connected to a biasing member 120. The biasing member 120 may rotationally bias the lever 100, such as toward engagement with the first side wall 46 and/or the window 60 (e.g., toward a first position of the lever 100).

In embodiments, such as generally illustrated in FIGS. 2A, 2B, 3A, 3B, 4A, and 4B, the lever 100 may include a contact portion 110. The contact portion 110 may be disposed at or about a bottom of the lever 100. The contact portion 110 may include one or more of a variety of shapes, sizes, and/or configurations. For example and without limitation, the contact portion 110 may be substantially triangular (see, e.g., FIGS. 3A and 3B). The contact portion 110 may include a first portion 112 (e.g., a rear side) and a second portion 114 (e.g., a front side). The first portion 112 may be closer than the second portion 114 to the first edge 62 of the window 60, such as when the support member 80 is disposed in the first portion 66 of the track 40. The second portion 114 may be closer than the first portion 112 to the second edge of 64 the window 60, such as when the support member 80 is disposed in the first portion 66 of the track 40. The first portion 112 and/or the second portion 114 of the contact portion 110 may be configured to selectively contact the track 40 (e.g., the first edge 62, the second edge 64, and/or the first side wall 46 of the track 40). The middle portion 104 of the lever 100 may be disposed substantially within the support member 80 and the contact portion 110 may be disposed partially outside the support member 80, at least in a first position of the lever 100.

With embodiments, the first portion 112 and/or the second portion 114 may or may not be substantially planar. The first portion 112 may be substantially perpendicular to the longitudinal axis. The second portion 114 may not be substantially perpendicular to the longitudinal axis. For example and without limitation, the second portion 114 may be at an angle $\theta_1$ (e.g., an oblique and/or acute angle) with respect to the longitudinal axis of the track 40, which may provide the second portion 114 with a generally tapered configuration (see, e.g., FIGS. 3A and 3B). The second portion 114 may be tapered (e.g., tapered in a transverse direction) such that the length 110L of the contact portion 110 in the longitudinal direction may vary in a lateral direction. The first portion 112 and the second portion 114 may be connected at third portion 116. The third portion 116 may be substantially planar (see, e.g., FIG. 3A) and/or pointed (see, e.g., FIG. 3B).

Figure 4C:
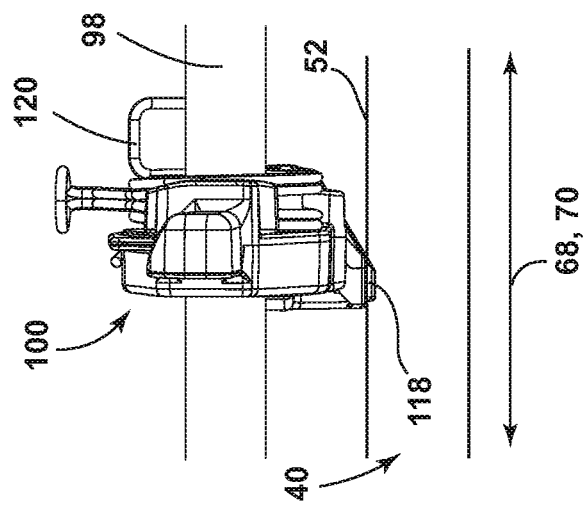
FIG. 4C is a perspective view generally illustrating portions of an embodiment of a track and a lever in a second position according to teachings of the present disclosure.
Figure 4B:
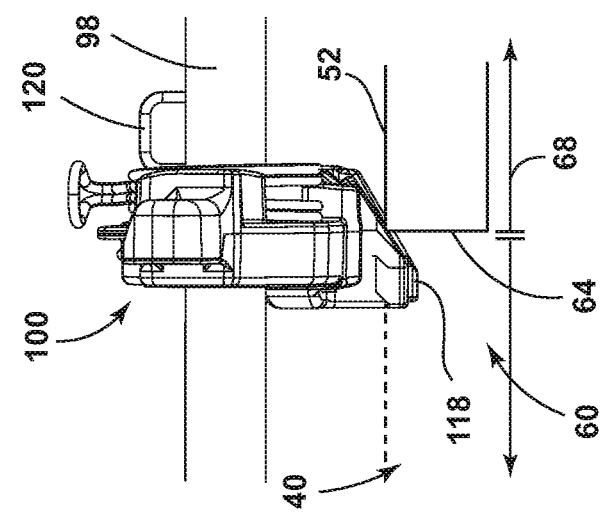
FIG. 4B is a perspective view generally illustrating portions of an embodiment of a track and a lever moving between a first position and a second position according to teachings of the present disclosure.
Figure 4A:
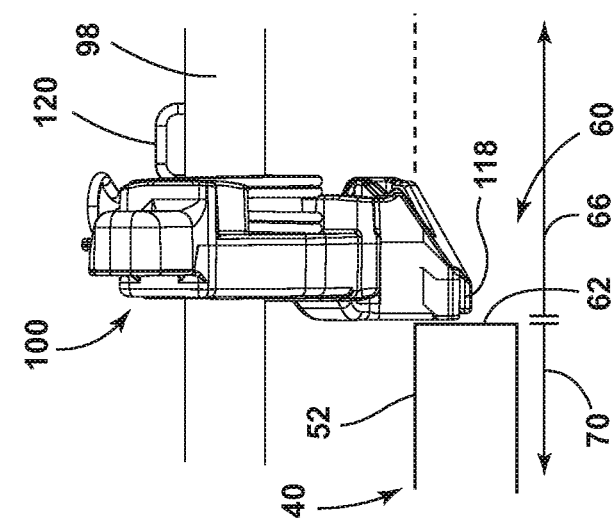
FIG. 4A is a perspective view generally illustrating portions of an embodiment of a track and a lever in a first position according to teachings of the present disclosure.

In embodiments, such as generally illustrated in FIGS. 4A, 4B, and 4C, the lever 100 may include a first position and/or a second position. The lever 100 may be in a first position when the support member 80 is disposed within the first portion 66 (e.g., a comfort range) of the track 40. When the support member 80 disposed in the second portion 68 (e.g., the easy-entry range) and/or the third portion 70 of the track 40, the lever 100 may be in a second position.

In embodiments, in the first position of the lever 100, the contact portion 110 may be longitudinally aligned with the outer wall of the track 40 (see, e.g., FIGS. 4A and 5A). In embodiments, the first portion 112 may contact the first edge 62 of the window 60 when the support member 80 is moving rearward (see, e.g., FIG. 4A). Contact between the first portion 112 and the first edge 62 of the window 60 may limit and/or prevent the support member 80 from moving longitudinally in a first direction (e.g., a rearward direction). The first portion 112 may include a damper portion 118. The damper portion 118 may include one or more force absorbing materials. For example and without limitation, the damper portion 118 may include rubber and/or a flexible polymer. The shape of the damper portion 118 may correspond and/or align with a shape of the first edge 62 of the window 60. The damper portion 118 may absorb longitudinal forces as the lever 100 contacts the first edge 62 of the window 60. Additionally or alternatively, the damper portion 118 may include sound dampening properties.

With embodiments, such as generally illustrated in FIGS. 4C, 5B, and 5C, in the second position of the lever 100, the contact portion 110 may be disposed outside the window 60 in the second position of the lever 100. For example and without limitation, in the second position of the lever 100, the contact portion 110 may not be longitudinally aligned with the outer wall of the track 40, at least when the support member 80 is disposed in the second portion 68 (e.g., easy-entry range) and/or third portion 70 of the track 40. In the second position of the lever 100, the third portion 116 of the contact portion 110 may contact an inner surface 52 of the first side wall 46 of the track 40 (see, e.g., FIG. 5B). For example, this contact may be the only contact between the contact portion 110 and the track 40 in the second position. Contact between the third portion 116 and the track 40 may not substantially limit and/or prevent movement of the support member 80 with respect to the track 40. In the second position of the lever 100, the first portion 112 and/or the second portion 114 may not be in contact with the track 40. In some circumstances, in the second position, the contact portion 110 may not contact the inner surface 52 (see, e.g., FIG. 5C).

In embodiments, such as generally illustrated in FIGS. 4B and 5B, the lever 100 and/or the contact portion 110 may move (e.g., rotate) between a first position and a second position. The second portion 114 of the contact portion 110 may contact the second edge 64 of the window 60 as the support member moves from the first portion 66 (e.g., comfort range) to the second portion 68 (e.g., easy-entry range) of the track 40. The second portion 114 may be configured such that upon contact with the second edge 64 of the window 60, the lever 100 may rotate away from the first position toward the second position. With embodiments, the force of the contact portion 110 contacting the second edge 64, such as provided via the support member 80 sliding, may be greater than the force of the biasing member 120. For example and without limitation, the biasing member 120 may be overcome by contact between the tapered second portion 114 and the second edge 64, which may cause rotation of the lever 100 from the first position to the second position. The force involved in rotating the lever 100 out of the first position may correspond to the angle between the second portion 114 and the second edge 64 of the window 60.

With embodiments, the lever 100 may move from the first position to the second position automatically (e.g., without being externally actuated). For example and without limitation, actuation of the lever 100 from the first position to the second position as the support member 80 moves from the first portion 66 to the second portion 68 of the track 40 may be caused by the interaction between the contact portion 110 and the second edge 64 of the window 60, and may not be caused by an actuator 34 connected to the lever 100. The contact portion 110 may rotate from the first position to the second position as the second portion 114 slides along the second edge 64. The lever 100 may rotate, for example, about 45 degrees or less when moving between the first position and the second position.

In embodiments, as the support member 80 moves from the second portion 68 to the first portion 66 of the track 40 (e.g., returns to an easy entry range), the contact portion 110 may move from the second position toward the first position, which may include moving into alignment with (e.g., rotating into) the window 60. For example and without limitation, the force of the biasing member 120 may automatically rotate the lever toward the first position, such as if the third portion 70 of the contact portion 110 is no longer in contact with the inner surface 52 of the first side wall 46.

With embodiments, while the support member is in the first portion 66 of the track 40 (e.g., the comfort range), the lever 100 may be in a first position. The support member 80 may move along the track 40 (e.g., in a rearward direction) until the first portion 112 of the contact portion 110 contacts the first edge 62 of the window 60, such as if the support member 80 reaches the third portion 70 of the track 40. Contact between the first portion 112 and the first edge 62 may restrict ad/or prevent further rearward movement of the support member 80. The contact portion 110 may not automatically rotate upon contacting the first end of the window 60. With embodiments, the lever 100 may be externally actuated (e.g., rotated), such as via an actuator 34, such that the first portion 112 of the contact portion 110 may not be aligned with the outer wall of the track 40 (e.g., the lever 100 may be rotated to the second position). The support member 80 may then move into the third portion 70 of the track 40. In the third portion 70 of the track 40, the third portion 116 of the contact portion 110 may or may not be in contact with the inner surface 52 of the first side wall 46. Contact between the third portion 116 and the inner surface 52 may not substantially affect movement of the support member 80 relative to the track 40.

In embodiments, the support member 80 may move in a forward direction from the third portion 70 to the first portion 66 (e.g., the comfort range) of the track 40. When moving from the third portion 70 to the first portion 66, the lever 100 may automatically move from the second position to the first position via the biasing member 120. For example and without limitation, once the first portion 112 of the contact portion 110 (e.g., rear side) moves past the first edge 62 of the window 60, the biasing member 120 may rotate the contact portion 110 outward and/or into the first position (e.g., into the window 60).

Figure 6:
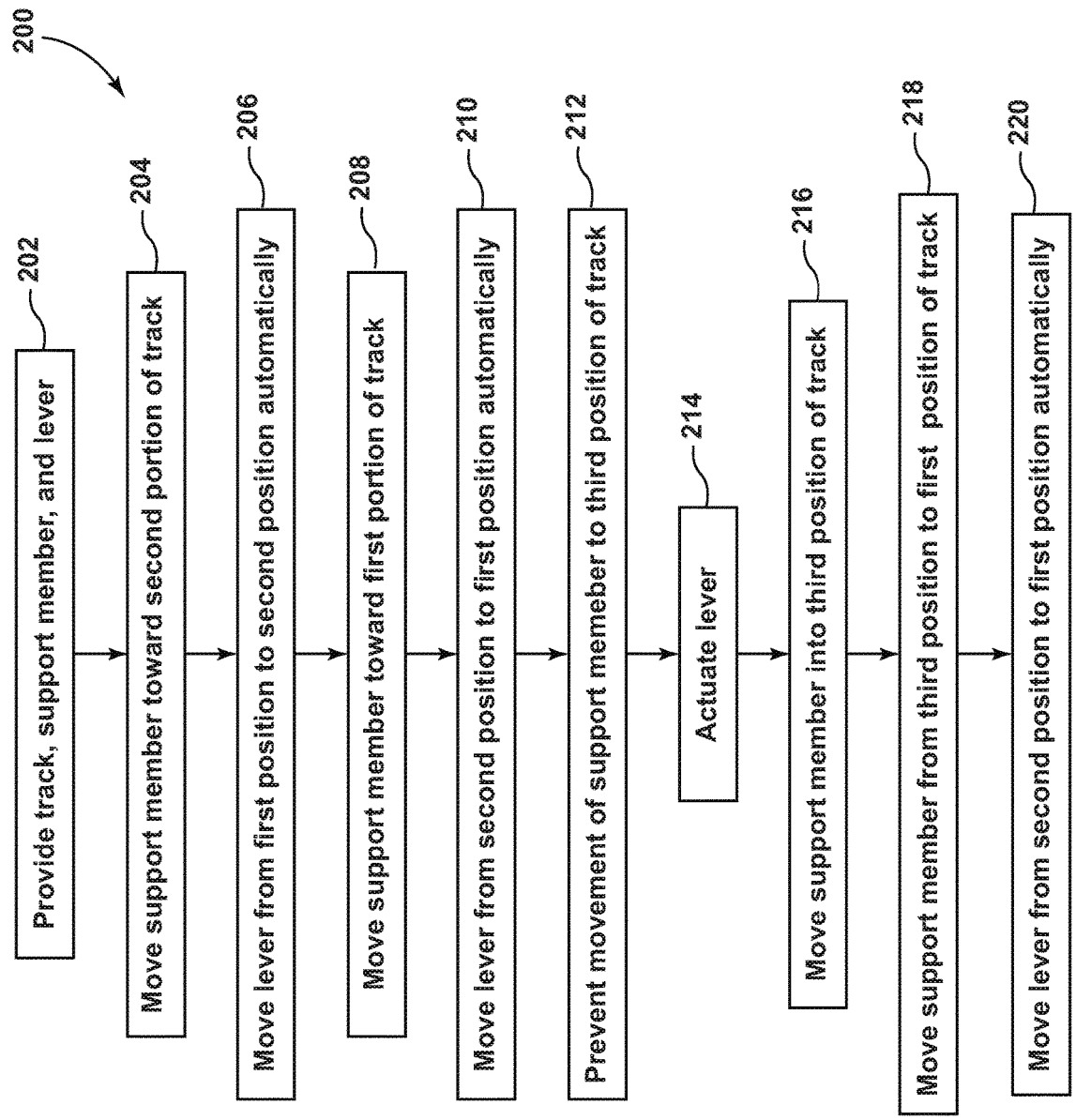
FIG. 6 is a flowchart generally illustrating an embodiment of a method of operating a track assembly.

In embodiments, such as generally illustrated in FIG. 6, a method 200 of operating a track assembly 20 may include providing a track assembly 20. Providing a track assembly may include providing a track 40, a support member 80, and/or a lever 100 (step 202). The track 40 may include a first portion 66 (e.g., a comfort range), a second portion 68 (e.g., an easy entry range), and/or a third portion 70. The support member 80, and an external component 30 that may be connected to the support member, may be disposed in a comfort range 66 of the track 40. With embodiments, the method 200 may include moving a support member 80 and/or lever 100 to a front of the comfort range 66 of the track 40 (step 204). The method 200 may include continuing to move the support member 80 (e.g., in a forward direction) from the comfort range 66 to the easy entry range 68 and automatically rotating the lever 100 from a first position to a second position (step 206). The lever 100 may rotate such as to not be longitudinally aligned with the first side wall 46. The method 200 may include moving the support member 80 and/or the lever 100 (e.g., in a rearward direction) from the easy entry range 68 to the comfort range 66 (step 208) and the lever 100 automatically rotating from the second position to the first position (step 210). In embodiments, the method 200 may include moving the support member 80 and/or the seat 30 to a rear of the comfort range of the track 40 and preventing further rearward movement of the support member 80 via the lever 100 contacting a first edge 62 (e.g., a rear end) of the window (step 212). The lever 100 may be externally rotated (e.g., from the first position to the second position) such that the contact portion 110 is not longitudinally aligned with the first side wall 46 and the support member 80 (step 214) and/or lever 100 may move into the third portion 70 of the track 40 (step 216). In embodiments, the method may include moving the support member 80 and/or lever 100 (e.g., in a forward direction) from the third portion 70 to the first portion 66 (step 218) and the lever 100 automatically rotating from the second position to the first position (step 220). In at least one position (e.g., the first position), the lever 100 may restrict movement of the support member 80 into the third portion 70 of the track 40. The lever 100 may not substantially/materially restrict movement of the support member 80 into the second portion 68 of the track 40 (e.g., regardless of the position of the lever 100).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly, comprising;
a track;
a support member connected to the track; and
a lever connected to the support member;
wherein the lever includes a rotational axis substantially parallel to the track; the lever is configured to rotate about the rotational axis between a first position and a second position; the lever is configured to limit movement of the support member relative to the track in a first direction; the lever is configured to not substantially limit movement of the support member relative to the track in a second direction; the lever includes a contact portion having a first portion, a second portion, and a third portion connected to the first portion and the second portion; the first portion is substantially perpendicular to the track; and the second portion is tapered.

2. The track assembly of claim 1, wherein the lever is configured to contact the track.

3. The track assembly of claim 1, wherein the track includes a window having a first edge and a second edge.

4. The track assembly of claim 3, wherein, a contact portion of the lever is disposed in the window when the lever is in the first position.

5. The track assembly of claim 1, wherein the third portion is not in contact with the track when the lever is in the first position.

6. The track assembly of claim 1, wherein the third portion is in contact with the track when the lever is in the second position.

7. The track assembly of claim 1, wherein the lever is not configured to rotate upon contact with a rear edge of a window of the track when the lever is in the first position.

8. The track assembly of claim 1, wherein the second portion is disposed at an acute angle relative to the first portion.

9. The track assembly of claim 1, wherein the lever includes a damper portion configured to contact a rear edge of a window of the track.

10. A track assembly, comprising;
a track;
a support member connected to the track; and
a lever connected to the support member;
wherein the lever includes a rotational axis substantially parallel to the track; the lever is configured to rotate about the rotational axis between a first position and a second position; the lever is configured to limit movement of the support member relative to the track in a first direction; the lever is configured to not substantially limit movement of the support member relative to the track in a second direction; the lever includes a contact portion having a first portion, a second portion, and a third portion connected to the first portion and the second portion; and the second portion is configured to cause rotation of the lever upon contact with a front edge of a window of the track.

11. The track assembly of claim 10, wherein the first portion is substantially perpendicular to the track, and the second portion is tapered.

12. The track assembly of claim 10, wherein the second portion is disposed at an acute angle relative to the front edge of the window.

13. The track assembly of claim 1, A track assembly, comprising;
a track;
a support member connected to the track; and
a lever connected to the support member;
wherein the lever includes a rotational axis substantially parallel to the track; the lever is configured to rotate about the rotational axis between a first position and a second position; the lever is configured to limit movement of the support member relative to the track in a first direction; the lever is configured to not substantially limit movement of the support member relative to the track in a second direction; the lever is not configured to automatically rotate when disposed in a window of the track and the support member is moving in the first direction; and, the lever is configured to automatically rotate when disposed in the window and the support member is moving in the second direction.

14. The track assembly of claim 1, wherein a seat is connected to the support member; and the seat is in an easy entry position when the lever is in the second position.

15. The track assembly of claim 1, wherein the track includes a first portion and a second portion; the first portion corresponds to a comfort range; the second portion corresponds to an easy entry range; and the track includes a window disposed in the first portion.

16. The track assembly of claim 15, wherein the lever is configured to automatically rotate out of the window as the support member moves from the first portion to the second portion; and the lever is configured to automatically rotate into the window as the support member moves from the second portion to the first portion.

17. The track assembly of claim 16, wherein the track includes a third portion; the first portion is disposed between the second portion and the third portion; and the lever is configured to automatically restrict movement of the support member into the third portion as the support member moves toward the third portion.

18. The track assembly of claim 1, including a biasing member configured to bias the lever toward the first position.

19. The track assembly of claim 1, wherein the lever is disposed substantially within the support member when the lever is in the second position, and a body of the support member is disposed above the track.

20. The track assembly of claim 13, wherein the lever includes a contact portion having a first portion, a second portion, and a third portion connected to the first portion and the second portion.

\* \* \* \* \*